(12) United States Patent  
Burns et al.

(10) Patent No.: US 8,727,270 B2  
(45) Date of Patent: May 20, 2014

(54) AIRCRAFT, PROPULSION SYSTEM, AND SYSTEM FOR TAXIING AN AIRCRAFT

(75) Inventors: Donald Burns, Avon, IN (US); Kaushik Rajashekara, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 642 days.

(21) Appl. No.: 12/947,451

(22) Filed: Nov. 16, 2010

(65) Prior Publication Data

US 2012/0153076 A1    Jun. 21, 2012

(51) Int. Cl.  
*B64D 41/00* (2006.01)

(52) U.S. Cl.  
USPC .............................. 244/58; 244/53 R; 244/57

(58) Field of Classification Search  
USPC ............................................ 244/58, 53 R, 57  
See application file for complete search history.

(56) References Cited

U.S. PATENT DOCUMENTS

| | | | |
|---|---|---|---|
| 3,834,161 A * | 9/1974 | Quigley et al. .................. 60/244 |
| 5,349,814 A * | 9/1994 | Ciokajlo et al. ............. 60/226.1 |
| 5,553,449 A | 9/1996 | Rodgers et al. |
| 5,813,630 A | 9/1998 | Williams |
| 5,899,411 A | 5/1999 | Latos et al. |
| 6,256,977 B1 | 7/2001 | McGinley et al. |
| 6,296,957 B1 * | 10/2001 | Graage .......................... 429/425 |
| 6,634,596 B2 | 10/2003 | Albero et al. |
| 6,641,084 B1 * | 11/2003 | Huber et al. .................... 244/48 |
| 6,704,625 B2 | 3/2004 | Albero et al. |
| 6,834,831 B2 | 12/2004 | Daggett |
| 7,105,937 B2 | 9/2006 | Hoppe et al. |
| 7,117,683 B2 | 10/2006 | Thompson |
| 7,207,521 B2 | 4/2007 | Atkey et al. |
| 7,306,871 B2 | 12/2007 | Grieve et al. |
| 7,380,749 B2 | 6/2008 | Fucke et al. |
| 7,513,119 B2 | 4/2009 | Zielinski et al. |
| 7,882,691 B2 * | 2/2011 | Lemmers et al. .......... 60/39.163 |
| 2004/0124308 A1 * | 7/2004 | Daggett ......................... 244/58 |
| 2004/0129835 A1 * | 7/2004 | Atkey et al. ................ 244/118.5 |
| 2006/0042252 A1 * | 3/2006 | Derouineau .................... 60/703 |
| 2006/0260323 A1 * | 11/2006 | Moulebhar ..................... 60/793 |
| 2007/0101721 A1 * | 5/2007 | Dooley et al. .................. 60/721 |
| 2007/0151258 A1 * | 7/2007 | Gaines et al. ................... 60/792 |
| 2008/0070078 A1 | 3/2008 | Gummalla et al. |
| 2008/0085430 A1 * | 4/2008 | MacBain et al. ................. 429/9 |
| 2008/0217466 A1 | 9/2008 | Bhargava |
| 2009/0007569 A1 * | 1/2009 | Lemmers et al. .............. 60/792 |
| 2009/0072080 A1 | 3/2009 | Bhargava |

* cited by examiner

*Primary Examiner* — Tien Dinh  
*Assistant Examiner* — Justin Benedik  
(74) *Attorney, Agent, or Firm* — Krieg DeVault LLP

(57) ABSTRACT

One embodiment of the present invention is a unique aircraft. Another embodiment is a unique aircraft propulsion system. Still another embodiment is a unique system for taxiing an aircraft without starting one or more main aircraft propulsion engines. Other embodiments include apparatuses, systems, devices, hardware, methods, and combinations for aircraft taxiing and propulsion systems. Further embodiments, forms, features, aspects, benefits, and advantages of the present application will become apparent from the description and figures provided herewith.

21 Claims, 7 Drawing Sheets

AIRCRAFT, PROPULSION SYSTEM, AND SYSTEM FOR TAXIING AN AIRCRAFT

FIELD OF THE INVENTION

The present invention relates to aircraft, aircraft propulsions systems and systems for taxiing an aircraft without starting main engines.

BACKGROUND

Aircraft, aircraft propulsions systems and systems that provide for aircraft taxiing without starting one or more main aircraft engines remain an area of interest. Some existing systems have various shortcomings, drawbacks, and disadvantages relative to certain applications. Accordingly, there remains a need for further contributions in this area of technology.

SUMMARY

One embodiment of the present invention is a unique aircraft. Another embodiment is a unique aircraft propulsion system. Still another embodiment is a unique system for taxiing an aircraft without starting one or more main aircraft propulsion engines. Other embodiments include apparatuses, systems, devices, hardware, methods, and combinations for aircraft taxiing and propulsion systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
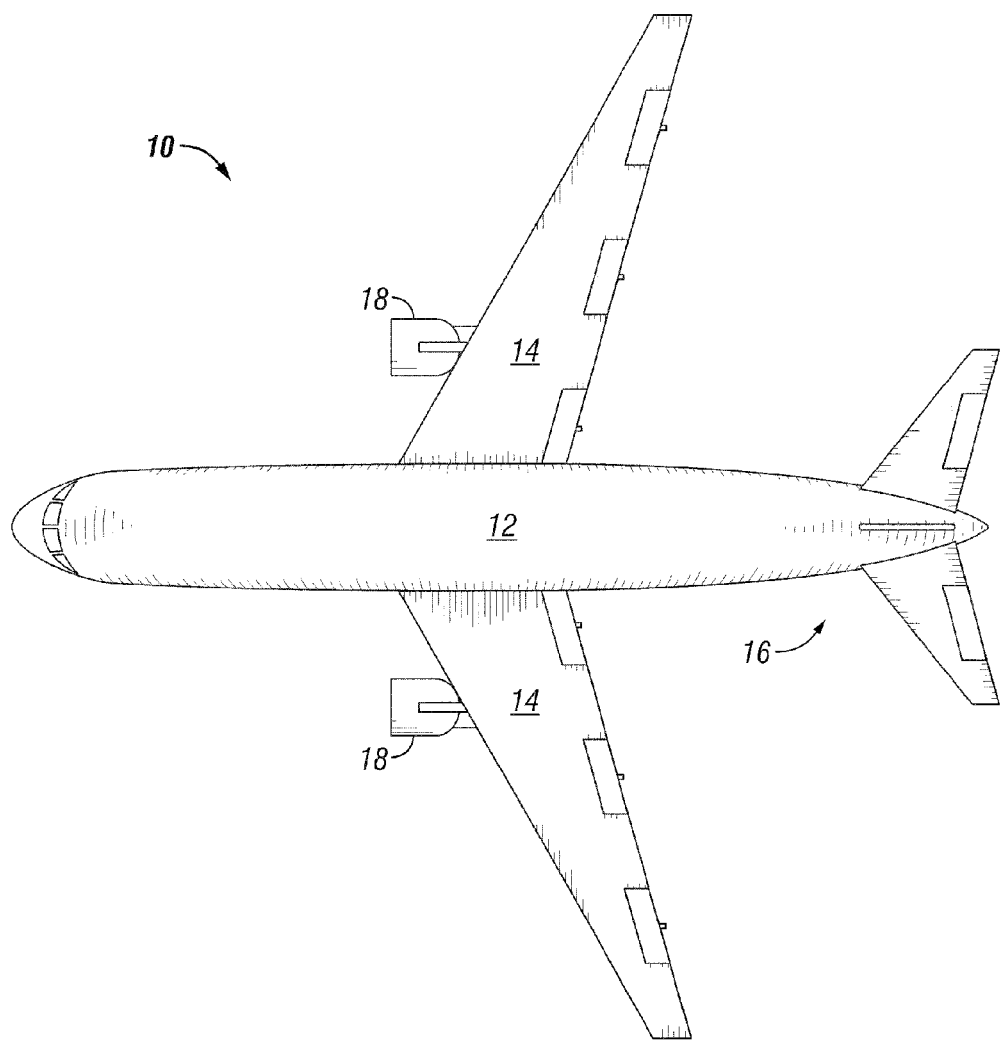
FIG. 1 illustrates some aspects of a non-limiting example of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of a vehicle 10 in accordance with an embodiment of the present invention. In one form, vehicle 10 is an aircraft, referred to herein as aircraft 10. In other embodiments, vehicle 10 may be any type of engine powered vehicle, including one or more types of air-vehicles; land vehicles, including and without limitation, tracked and/or wheeled vehicles; marine vehicles, including and without limitation, surface vessels, submarines and/or semi-submersibles; amphibious vehicles, or any combination of one or more types of air, marine and land vehicles. In various forms, vehicle 10 may be manned and/or autonomous.

In one form, aircraft 10 includes a fuselage 12, wings 14, an empennage 16 and propulsion systems 18. In one form, aircraft 10 is a twin engine turbofan aircraft. In other embodiments, aircraft 10 may be any fixed-wing aircraft, including turbofan aircraft, turbojet aircraft and turboprop aircraft. In still other embodiments, aircraft 10 may be a rotary-wing aircraft or a combination rotary-wing/fixed-wing aircraft. In various embodiments, aircraft 10 may have a single main propulsion engine or a plurality of main propulsion engines. In addition, in various embodiments, aircraft 10 may employ any number of wings 14. Empennage 16 may employ a single or multiple flight control surfaces.

Figure 2:
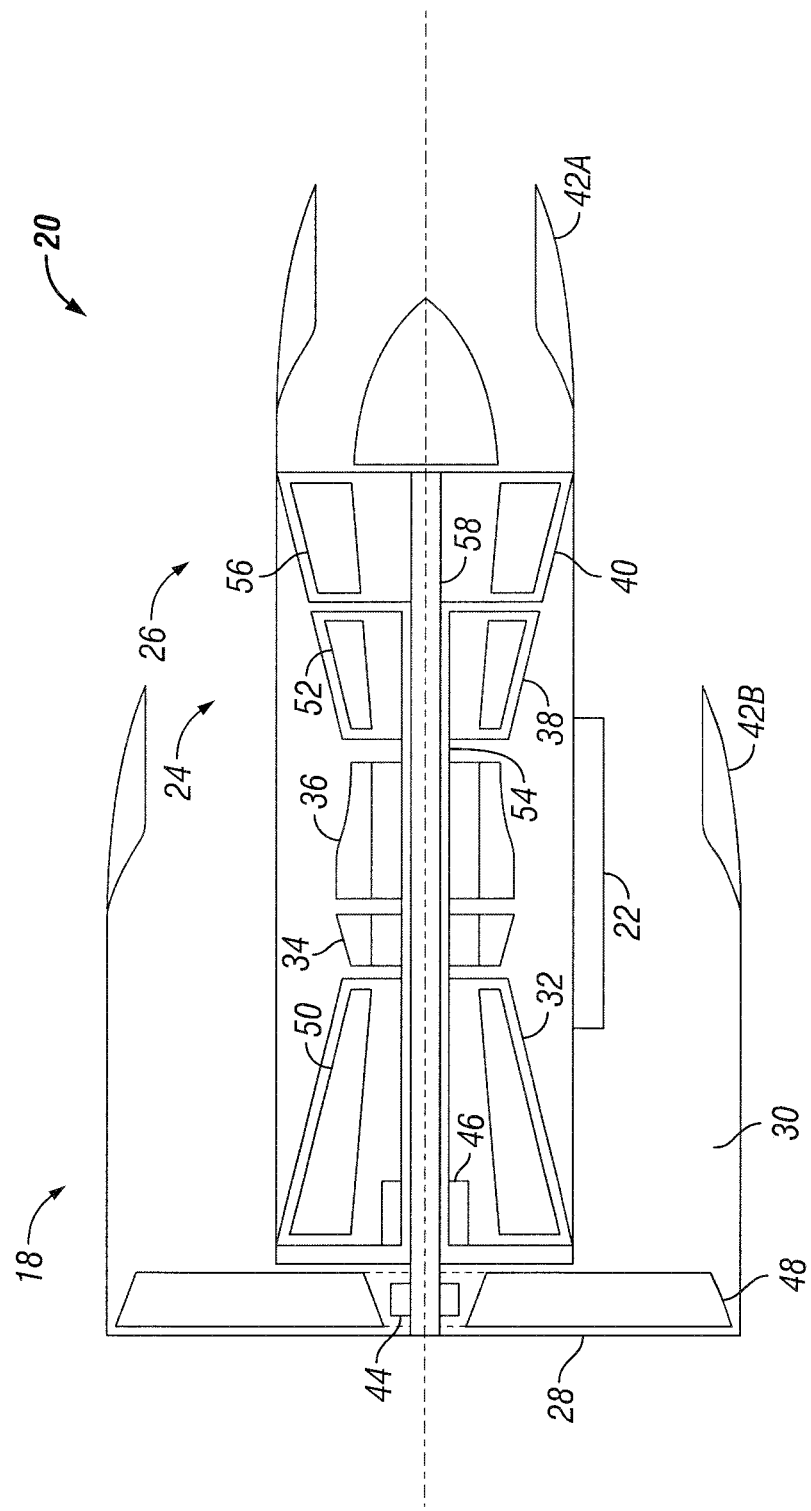
FIG. 2 schematically illustrates some aspects of a non-limiting example of an aircraft propulsion system in accordance with an embodiment of the present invention.

Referring to FIG. 2, there are illustrated some aspects of a non-limiting example of a propulsion system 18 in accordance with an embodiment of the present invention. Propulsion system 18 includes a gas turbine engine 20 as a main engine, i.e., main propulsion engine, and an auxiliary power unit 22. Although described herein as with respect to an aircraft propulsion system, in other embodiments, propulsion system 18 may be a propulsion system for providing propulsive thrust to one or more other types of vehicles, e.g., air-vehicles; land vehicles, including tracked and/or wheeled vehicles (e.g., battle tanks); marine vehicles, including surface vessels, submarines and/or semi-submersibles; amphibious vehicles; or any combination of one or more types of air, marine and land vehicles. The propulsive thrust provided by propulsion system 18 for an air vehicle in the form of one or more fast moving streams of air generated by one or more propulsors, for example and without limitation, one or more turbofans, propellers, turbines, propfans and/or other rotor systems that generate thrust. The propulsive thrust provided by propulsion system 18 to land-based vehicles may include the tractive effort provided via one or more propulsors in the form of, for example and without limitation, wheels and/or tracks, e.g., using one or more transmissions. The propulsive thrust provided by propulsion system 18 to a marine vehicle may be in the form of one or more fast moving streams of water generated by one or more propulsors in the form of, for example and without limitation, one or more propellers, shrouded and/or not shrouded; hydrojets and/or jet-pumps.

In one form, APU 22 is a secondary gas turbine engine. In other embodiments, APU 22 may be one or more other types of thermodynamic machines configured to generate mechanical power from fuel, which may be used to drive other mechanical and/or electro-mechanical machines, e.g., including generators, refrigeration systems, thermal management systems and/or any other type of machine. For example, in some embodiments, APU 22 may be a turbocharged, supercharged and/or normally aspirated piston engine or a hybrid engine. In a particular form, auxiliary power unit 22 is a hybrid auxiliary power unit (hybrid APU 22) that includes a secondary gas turbine engine. In other embodiments, APU 22 may not be a hybrid APU.

In one form, engine 20 is a primary propulsion engine that provides thrust for flight operations of aircraft 10. In one form, engine 20 is a two spool engine having a high pressure (HP) spool 24 and a low pressure (LP) spool 26. In other embodiments, engine 20 may include three or more spools, e.g., may include an intermediate pressure (IP) spool and/or other spools. In one form, engine 20 is a turbofan engine, wherein LP spool 26 is operative to drive a propulsor 28 in the form of a turbofan (fan) system, which may be referred to as a turbofan, a fan or a fan system. In other embodiments, engine 20 may be a turboprop engine, wherein LP spool 26 powers a propulsor 28 in the form of a propeller system (not shown), e.g., via a reduction gearbox (not shown). In still other embodiments, propulsor 28 may take other forms, such as a helicopter rotor or tilt-wing aircraft rotor. In one form, a single propulsion system 18 is coupled to each wing 14 of aircraft 10. In other embodiments, more than one propulsion system 18 may be coupled to each wing 14. In still other embodiments, one or more propulsion systems 18 may be coupled to the fuselage or the empennage in addition to or in place of wing-mounted propulsion systems 18.

In one form, engine 20 includes, in addition to fan system 28, a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. In various embodiments, engine 20 may also include an electrical machine 44 coupled to LP spool 26, and an electrical machine 46 coupled to HP spool 24. In one form, each of electrical machines 44 and 46 are configured to convert mechanical power to electrical power, and to convert electrical power to mechanical power, e.g., as in a motor/generator. In other embodiments, one or both of electrical machines 44 and 46 may be configured to only convert mechanical power into electrical power, e.g., as in a generator. In still other embodiments, one or both of electrical machines 44 and 46 may be configured to only convert electrical power into mechanical power, e.g., as in a motor. In one form, both electrical machine 44 and electrical machine 46 are configured to provide power to aircraft 10 during flight operations. In various embodiments, one or both of electrical machines 44 and 46 may also provide power to aircraft 10 during ground operations.

In the depicted embodiment, the engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor system 32 are in fluid communication with fan system 28. Nozzle 42B is in fluid communication with bypass duct 30. Diffuser 34 is in fluid communication with compressor system 32. Combustion system 36 is fluidly disposed between compressor system 32 and turbine system 38. Turbine system 40 is fluidly disposed between turbine system 38 and nozzle 42B. In one form, combustion system 36 includes a combustion liner (not shown) that contains a continuous combustion process. In other embodiments, combustion system 36 may take other forms, and may be, for example, a wave rotor combustion system, a rotary valve combustion system, a pulse detonation combustion system or a slinger combustion system, and may employ deflagration and/or detonation combustion processes.

Fan system 28 includes a fan rotor system 48 driven by LP spool 26. In various embodiments, fan rotor system 48 includes one or more rotors (not shown) that are powered by turbine system 40. Fan system 28 may include one or more vanes (not shown). Bypass duct 30 is operative to transmit a bypass flow generated by fan system 28 around the core of engine 20. Compressor system 32 includes a compressor rotor system 50. In various embodiments, compressor rotor system 50 includes one or more rotors (not shown) that are powered by turbine system 38. Turbine system 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine system 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. Turbine system 40 is operative to discharge the engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air, and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

Figure 3:
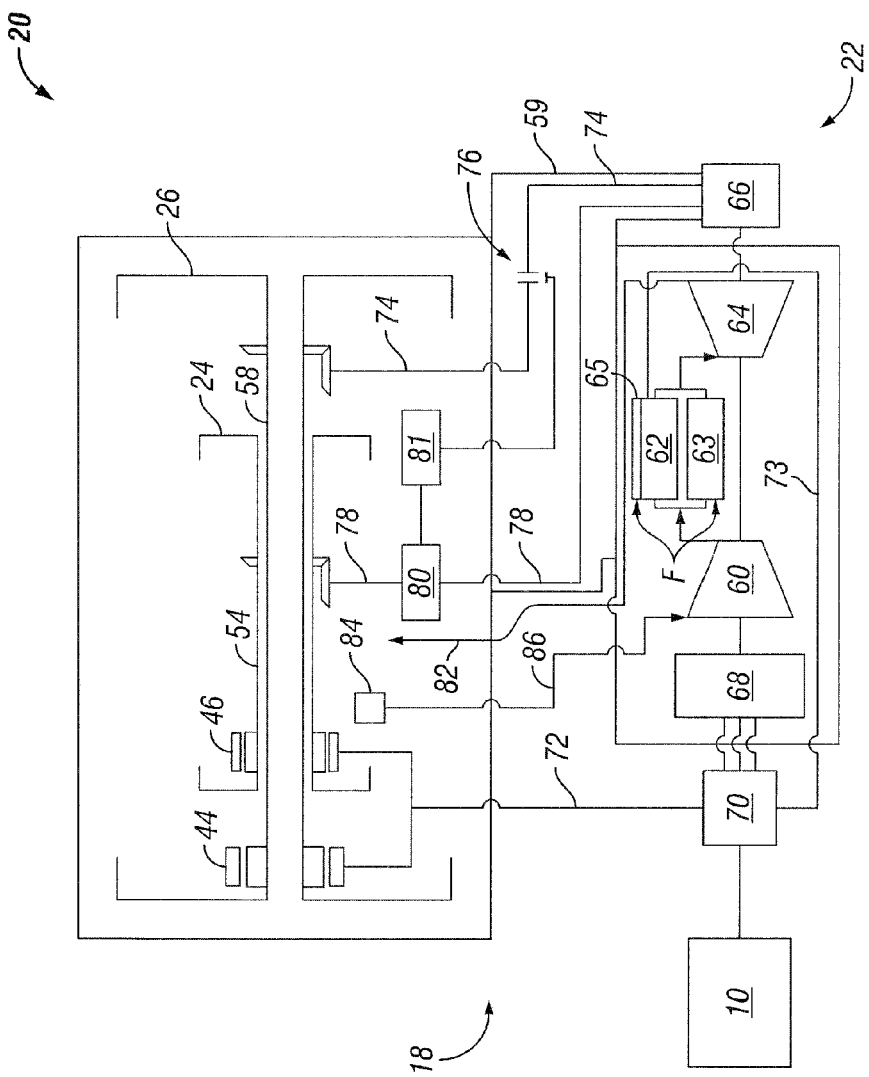
FIG. 3 schematically illustrates some aspects of a non-limiting example of a system for taxiing an aircraft in accordance with an embodiment of the present invention.

Referring to FIG. 3, some aspects of a non-limiting example of hybrid APU 22 and some of its connections to engine 20 in accordance with an embodiment of the present invention are schematically depicted. Engine 20 includes a gearbox 59 that is coupled to both HP spool 24 and LP spool 26. In other embodiments, other gearboxes may be employed. In one form, hybrid APU 22 is coupled to both HP spool 24 and LP spool 26 via gearbox 59. Hybrid APU 22 is operative to supply rotational power, mechanically, to both HP spool 24 and LP spool 26, to generate thrust via propulsor 28 for taxiing aircraft 10 without starting engine 20. In one form, hybrid APU 22 is mechanically coupled to both HP spool 24 and LP spool 26 to directly drive HP spool 24 and LP spool 26 mechanically. In other embodiments, other arrangements, e.g., mechanical arrangements, may be employed to drive both HP spool 24 and LP spool 26. In other embodiments, hybrid APU 22 may be mechanically coupled to only LP spool 26 to directly drive HP spool 24 and LP spool 26 mechanically, to generate thrust via propulsor 28 for taxiing aircraft 10 without starting engine 20.

In one form, hybrid APU 22 is configured to supply rotational power to both HP spool 24 and LP spool 26 to provide sufficient thrust to taxi aircraft 10 without starting one or more engines 20. In one form, the primary component of the taxiing thrust is produced by propulsor 28. The rotational power supplied to HP spool 24 reduces drag on the rotation of LP spool 26, and may result in a secondary taxiing thrust component being produced by HP spool 24. LP spool 26 turbines may also provide a secondary taxiing thrust component.

In one form, hybrid APU 22 is mounted on engine gearbox 59. In other embodiments, hybrid APU 22 may be mounted to other structures. Hybrid APU 22 includes an APU compressor 60, a fuel cell 62, an APU start-up combustor 63, an APU turbine 64, an output reduction gearbox 66 and an electrical machine 68. APU compressor 60 is coupled to and driven by APU turbine 64. The discharge of APU compressor 60 is in fluid communication with fuel cell 62 and combustor 63. Valves (not shown) may be employed to selectively direct the discharge air from APU compressor 60 to one or both of fuel cell 62 and APU start-up combustor 63. The discharge of fuel cell 62 and combustor 63 is in fluid communication with APU turbine 64. Valves (not shown) may be employed to selectively direct the discharge air from one or both of fuel cell 62 and combustor 63 into APU turbine 64. APU Turbine 64 is coupled to compressor 60 and operative to drive compressor 60. Reduction gearbox 66 is coupled to gearbox 59 for delivering the mechanical power output from hybrid APU 22 to engine 20.

Fuel cell 62 is fluidly disposed between compressor 60 and turbine 64. Fuel cell 62 is configured to generate electrical power for use by aircraft 10 during ground operations and/or flight operations. Fuel cell 62 is configured to receive a fuel F, and pressurized air from compressor 60 for use as an oxidant, and to generate electrical power using fuel F and the oxidant. Fuel cell 62 is also configured to add heat to the pressurized air received from compressor 60. The temperature output by fuel cell 62 may vary with the application and/or type of fuel cell. In various embodiments, the output temperature is in the range of 600° C. to 1200° C. In other embodiments, fuel cell 62 may yield other output temperatures outside aforementioned range. Fuel cell 62 discharges the heated pressurized air into turbine 64 for extraction of mechanical power, which is transmitted to reduction gearbox 66. In some embodiments, a combustor or other heat addition device (not shown) may be positioned downstream of fuel cell 62 to increase the temperature of the gases discharged into turbine 64.

In one form, fuel cell 62 is a solid oxide fuel cell (SOFC). In other embodiments, other fuel cell types may be employed, e.g., such as a molten carbonate fuel cell (MCFC). In one form, fuel cell 62 is electrically coupled to a power conditioner for conditioning the output of fuel cell 62 for subsequent delivery to aircraft 10 components and/or engine 20 components. In other embodiments, fuel cell 62 may be electrically coupled to other components. In one form, a reformer 65 is in fluid communication with fuel cell 62. Reformer 65 is configured to reform fuel F, e.g., a typical aircraft gas turbine engine fuel, into syngas for use by fuel cell 62. In other embodiments, fuel cell 62 may not include a reformer, e.g., depending upon the type of fuel cell used in an application and/or the type of fuel F supplied to fuel cell 62.

APU start-up combustor 63 is fluidly disposed between compressor 60 and turbine 64. APU start-up combustor 63 is configured to receive fuel F and combust fuel in pressurized air received from compressor 60. In one form, combustor 63 is configured to add heat to the pressurized air received from compressor 60 prior to fuel cell 62 achieving its normal operating temperature. The heated pressurized air is discharged into turbine 64 for extraction of mechanical power. In one form, once fuel cell 62 has achieved its operating temperature, combustor 63 is shut off. In some embodiments, both fuel cell 62 and combustor 63 may both be continuously operated to add heat to pressurized air from compressor 60. In other embodiments, combustor 63 may be employed alone, e.g., where the electrical output of fuel cell 62 is not required. Still other embodiments may not employ a start-up combustor, such as start-up combustor 63, e.g., but rather may rely on fuel cell 62 to add heat to air pressurized by compressor 60.

In one form, reduction gearbox 66 is coupled to and driven by turbine 64. In other embodiments, reduction gearbox 66 may be coupled to compressor 60 and driven by turbine 64 via compressor 60 or a shaft extending from turbine 64. Reduction gearbox 66 is coupled to engine gearbox 59 for delivering mechanical power to HP spool 24 and/or LP spool 26. In one form, reduction gearbox 66 is considered a part of hybrid APU 22. In other embodiments, reduction gearbox 66 may be considered a separate component that is powered by hybrid APU 22.

Electrical machine 68 is operative to convert mechanical power to electrical power. Electrical machine 68 is coupled to hybrid APU 22. In one form, electrical machine 68 is coupled to compressor 60. In other embodiments, other mechanical arrangements may be employed. For example, electrical machine 68 may be coupled directly to turbine 64, or may be coupled to the same or other APU 22 components directly or via a gearbox and/or clutch system.

In some embodiments, electrical machine 68 may be also configured to convert electrical power to mechanical power, e.g., as a motor/generator for starting hybrid APU 22. In some embodiments, a power conditioner 70 is electrically coupled to electrical machine 68 and operative to condition the power output of electrical machine 68, e.g., for use in supplying electrical power to one or more systems of aircraft 10 during aircraft 10 ground operations and/or flight operations, and/or for supplying electrical power to one or more engine 20 systems or components, such as electrical machines 44 and 46. In some embodiments, electrical machine 68 is configured to provide electrical power to drive electrical machine 44 and/or electrical machine 46. For example, in one form, power generated by electrical machine 68 may be employed to start or to aid in the starting of engine 20 by providing electrical power to electrical machines 44 and/or 46. In the depiction of FIG. 3, a line 72 indicates an electrical coupling of electrical machines 44 and 46 to power conditioning unit 70 for supplying power from electrical machine 68 to electrical machines 44 and 46, and for supplying power from electrical machines 44 and 46 to aircraft 10, e.g., during aircraft 10 flight and/or ground operations. Although a single line 72 is depicted, it will be understood that the depiction is schematic only, and does limit the type of coupling between electrical machines 44 and 46 and power conditioning unit 70. In addition, it will be understood that other electrical means may be employed to couple the output of electrical machines 44 and 46 to aircraft 10 and/or to electrical machine 68. A line 73 similarly schematically indicates an electrical coupling of fuel cell 62 to power conditioning unit 70 for supplying power from fuel cell 62 to electrical machines 44, 46 and 68 (e.g., via conditioning unit 70), and to aircraft 10 during flight and/or ground operations. It will be understood that other electrical means may be employed to couple the output of fuel cell 62 to electrical machines 44, 46 and 68, and to aircraft 10. In some embodiments, electrical machine 68 may be electrically coupled to only one of electrical machine 44 and electrical machine 46. In still other embodiments, electrical machine 68 may not be electrically coupled to either electrical machine 44 or electrical machine 46.

Reduction gearbox 66 is mechanically coupled to LP spool 26 via gearbox 59 and a shafting system 74, and is operative to drive LP spool 26. In one form, a clutch 76 is disposed between LP spool 26 and reduction gearbox 66. Clutch 76 is configured to mechanically engage and disengage hybrid APU 22 from LP spool 26 of the gas turbine engine 20. Some embodiments may employ an overrunning (sprag) clutch between hybrid APU 22 and LP spool 26.

In one form, reduction gearbox 66 is also mechanically coupled to HP spool 24, via gearbox 59 and a shafting system 78, and is operative to drive HP spool 24. Shafting system 74 and shafting system 78 combine to couple both LP spool 26 and HP spool 24 to reduction gearbox 66. In other embodiments, other mechanical drive arrangements may be employed to couple hybrid APU 22 to LP spool 26 and HP spool 24. In still other embodiments, one or more mechanical drive systems may be employed for hybrid APU to drive one or more other engine spools. In addition, some embodiments may not include a shafting system to couple hybrid APU 22 to HP spool 24.

In one form, a transmission 80 is mechanically disposed in shafting system 78 between reduction gearbox 66 and HP spool 24. In some embodiments, transmission 80 may be considered a part of reduction gearbox 66. In other embodiments, transmission 80 may be considered separate from reduction gearbox 66. In yet other embodiments, transmission 80 may be considered a part of engine gearbox 59 and/or installed therein or mounted thereon. In some embodiments, transmission 80 may be mechanically disposed between hybrid APU 22 and LP spool 26.

In one form, transmission 80 is a continuously variable transmission. In other embodiments, other transmission types may be employed. Transmission 80 is configured to vary the speed as between the high pressure spool and the low pressure spool. In one form, transmission 80 is coupled to HP spool 24 and is configured to vary the speed of HP spool 24 relative to LP spool 26, e.g., in order to optimize or minimize drag while LP spool 26 is being powered by hybrid APU 22. In other embodiments, transmission 80 is coupled to LP spool 26 and is configured to vary the speed of LP spool 26 relative to HP spool 24. In one form, transmission 80 is also configured to selectively engage/disengage HP spool 24 with/from hybrid APU 22. In other embodiments, clutches (not shown) may be used in addition to or in place of transmission 80 to disengage HP spool 24 from hybrid APU 22, e.g., including overrunning clutches. In embodiments where transmission 80 is mechanically disposed between reduction gearbox 66 and LP spool 26, transmission 80 may be configured to engage and disengage LP spool 26 with/from hybrid APU 22. In other embodiments, clutches (not shown) may be used in addition to or in place of transmission 80 to disengage LP spool 26 from hybrid APU 22.

In one form, transmission 80 is controlled by a controller 81. Controller 81 is in electrical communication with transmission 80 and clutch 76. Controller 81 is configured to execute program instructions to selectively control transmission 80 to vary the speed ratio between HP spool 24 and LP spool 26 to reduce internal drag in engine 20, e.g., aerodynamic losses in engine 20. Controller 81 is also configured to execute program instructions to control clutch 76 to selectively engage and disengage LP spool 26 with hybrid APU 22. In addition, controller 81 is configured to execute program instructions to selectively direct transmission 80 to engage HP spool 24 and/or LP spool 26 with hybrid APU 22, and to disengage HP spool 24 and/or LP spool 26 from the hybrid APU. For example, in one form, transmission 80 is coupled to HP spool 24, and is controlled by controller 81 to vary the speed of HP spool 24, and to engage and disengage hybrid APU 22 from HP spool 24. In other embodiments, transmission 80 may be coupled to LP spool 26, and may be controlled by controller 81 to vary the speed of HP spool 24, and to engage and disengage hybrid APU 22 from HP spool 24. In still other embodiments, transmission 80 may be coupled to both HP spool 24 and LP spool 26, and may be controlled by controller 81 to vary the speed of both HP spool 24 and LP spool 26, and to engage and disengage hybrid APU 22 from HP spool 24 and LP spool 26.

In one form, controller 81 is microprocessor based and the program instructions are in the form of software stored in a memory and firmware (not shown), such as a full authority digital electronic control (FADEC). However, it is alternatively contemplated that controller 81 and the program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software and/or firmware and/or hardware based instructions.

In order to begin taxiing aircraft 10, hybrid APU 22 is started. In one form, hybrid APU 22 is started by supplying power to electrical machine 68 to rotate compressor 60 and turbine 64. The power may be supplied to electrical machine 68 from a desired source, such as fuel cell 62, a battery and/or a ground cart. If fuel cell 62 is not at operating temperature, start-up combustor 63 is employed to add heat to the air pressurized by compressor 60 until fuel cell 62 reaches operating temperature. It will be understood that the method for starting hybrid APU 22 may vary, e.g., with the needs of the application and the existing operational environment of the particular application.

In one form, hybrid APU 22 is started prior to engaging HP spool 24 and LP spool 26, e.g., with transmission 80 and clutch 76, respectively. In other embodiments, one or both of HP spool 24 and LP spool 26 may be engaged with hybrid APU 22 prior to and during start-up of hybrid APU 22. Once engaged with APU 22, HP spool 24 and LP spool 26 rotate based on the rotation of hybrid APU 22. Rotation of LP spool 26 rotates propulsor 28 (fan rotor system 48) to produce thrust for taxiing aircraft 10. Rotation of HP spool 24 results in lower drag on the rotation of LP spool 26, thereby decreasing the total power output required by hybrid APU 22 to achieve a desired taxiing thrust level. Controller 81 controls transmission 80 to rotate HP spool 24 at a rate determined to result in reduced or minimum aerodynamic losses in engine 20 at the desired LP spool 26 rate of rotation, to reduce the drag on LP spool 26 in engine 20.

During hybrid APU 22 operation, hybrid APU 22 generates an exhaust flow. In one form, hybrid APU 22 exhaust flow is directed to engine 20, e.g., HP spool 24 in order to warm engine 20 prior to engine start, which may reduce the amount of time it takes to start engine 20. The hybrid APU 22 exhaust flow to engine 20 is illustrated as line 82 in FIG. 3. In various embodiments, valves and ducting (not shown) or other arrangements may be employed to direct the hybrid APU 22 exhaust flow to engine 20. The hybrid 22 exhaust flow may subsequently be directed away from engine 20, e.g., after engine 20 is warmed up or started.

Once aircraft 10 is ready, hybrid APU 22 may be used to start engine 20. In various embodiments, engine 20 may be started during or after taxi operations that are powered by hybrid APU 22. In one form, hybrid APU 22 is configured to start engine 20 by supplying mechanical power to rotate HP spool 24. In various embodiments, hybrid APU 22 may also rotate LP spool 26 to aid in starting engine 20. In some embodiments, hybrid APU 22 may be configured to start engine 20 by supplying electrical power to one or both of electrical machines 44 and 46 in addition to or in place of supplying mechanical power to HP spool 24 and/or LP spool 26 via reduction gearbox 66. In one form, the electrical power to start engine 20 is generated by both fuel cell 62 and electrical machine 68. In other embodiments, the electrical power may be generated by either fuel cell 63 or electrical machine 68. In still other embodiments, other electrical power sources may be employed in addition to or in place of one or both of fuel cell 62 and electrical machine 68. In one form, engine 20 is started following the completion of taxiing operations of aircraft 10. In other embodiments, engine 20 may be started during taxiing operations. In various embodiments, hybrid APU 22 is disengaged from engine 20 (HP spool 24 and LP spool 26) once engine 20 is started Propulsion system 18 is configured to provide sufficient thrust to taxi aircraft 10 without starting engines 20, which may result in fuel savings and a reduction in emissions during taxi operations, e.g., since hybrid APU 22 is generally more efficient than engine 20 at thrust levels associated with taxiing aircraft 10. Once aircraft 10 has reached a position where it is desirable to prepare for takeoff, engines 20 may be started, and disengaged from hybrid APUs 22.

By employing hybrid APU 22 to provide rotational power to LP spool 26 and hence propulsor 28, sufficient thrust may be provided for taxiing aircraft 10 without starting engines 20. By employing hybrid APU 22 to provide rotational power to HP spool 24 in addition to LP spool 26, friction is reduced during taxiing, e.g., aerodynamic drag within engine 20, which may further result in increased efficiency. In addition, because hybrid APU 22 may be used to start engine 20, the need for a pneumatic starter may be eliminated.

During engine 20 operation, engine 20 generates a bleed flow, e.g., from HP spool 24. The bleed flow is discharged from HP spool 24 through a bleed port 84. In some embodiments, the bleed flow is directed into APU compressor 60, indicated in FIG. 3 by line 86, which increases the efficiency of hybrid APU 22, and which may reduce emissions from hybrid APU 22. The bleed flow may be supplied via valves and ducting (not shown) or by other arrangements. In various embodiments, the bleed flow may be supplied from HP spool 24, e.g., to the inlet of compressor 60, during aircraft 10 flight and/or ground operations, including prior to engine 20 start.

Figure 4:
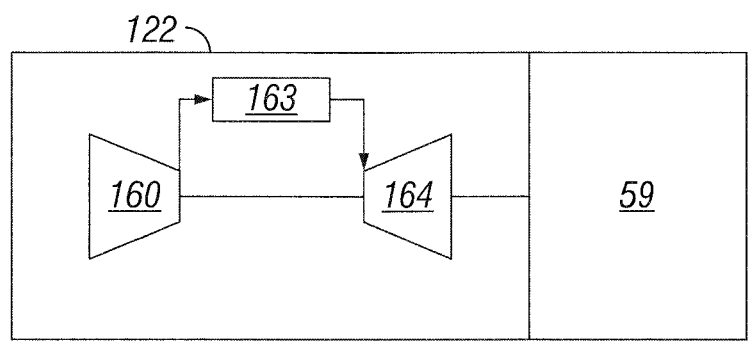
FIG. 4 schematically illustrates some aspects of a non-limiting example of a system for taxiing an aircraft in accordance with another embodiment of the present invention.
Figure 5:
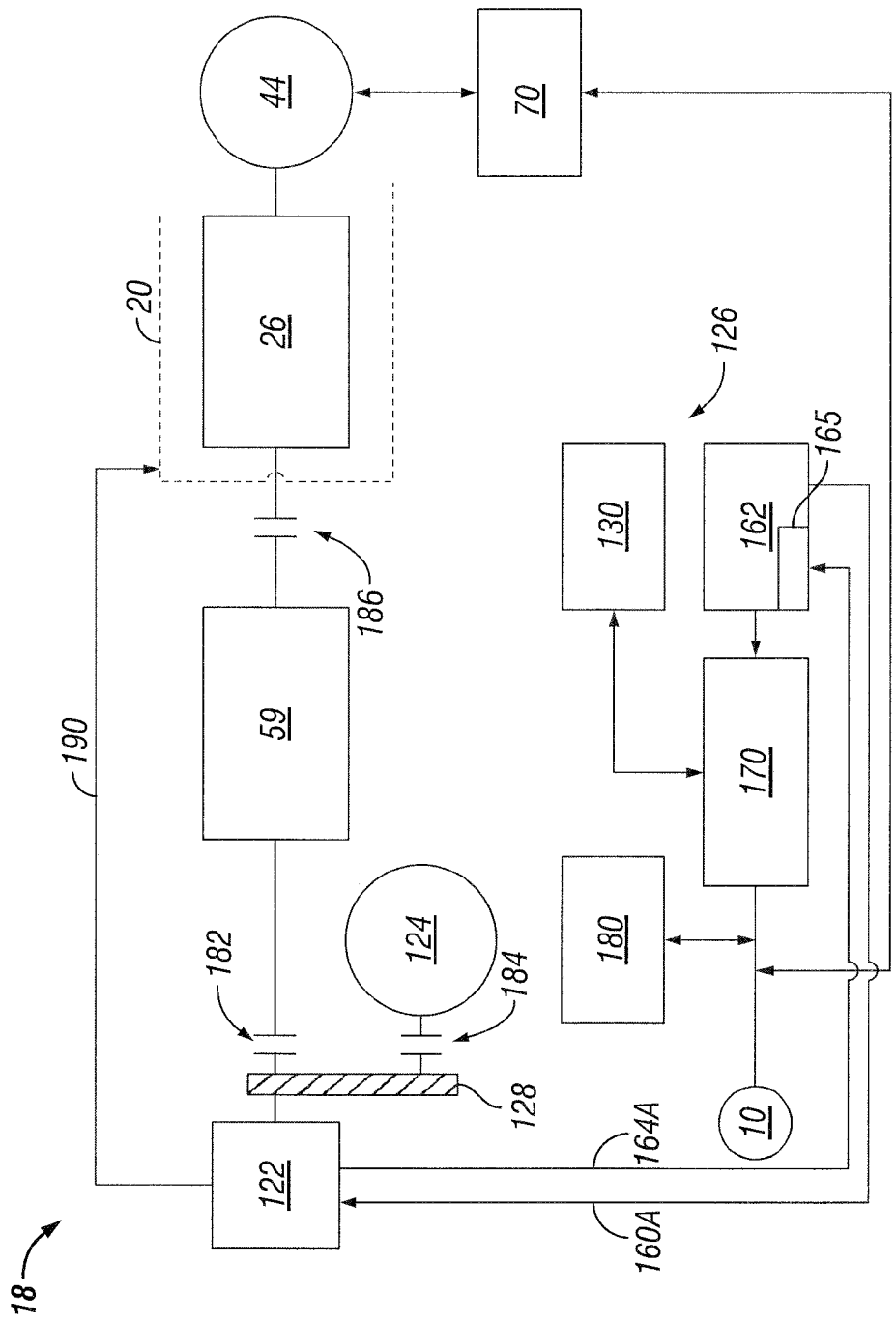
FIG. 5 schematically illustrates some additional aspects of a non-limiting example of a system for taxiing an aircraft in accordance with the embodiment of FIG. 4.

Referring to FIGS. 4 and 5, some aspects of a non-limiting example of propulsion system 18 in accordance with an embodiment of the present invention are schematically depicted. The embodiment of FIGS. 4 and 5 is similar in many respects to the embodiment of FIGS. 2 and 3; for the sake of brevity, many such similarities are not separately discussed herein. In the embodiment of FIGS. 4 and 5, propulsion system 18 includes, in addition to engine 20 as previously described, an APU 122, an auxiliary electrical machine 124, an electrical power source 126 and an auxiliary gearbox 128.

In one form, APU 122 is mechanically coupled to LP spool 26, and is operative to drive LP spool 26, e.g., via gearbox 128. In one form, gearbox 128 is a combining gearbox. In other embodiments, other gearbox types may be employed. In one form gearbox 128 is a single gearbox. In other embodiments, combining gearbox 128 may take other forms, including, for example, a plurality of discrete gear drives and/or one or more other mechanical drive types, e.g., harmonic drives, belt drives, chain drives and/or friction drives. Auxiliary electrical machine 124 is also mechanically coupled to LP spool 26, and is operative to drive LP spool 26. In particular, APU 122 and auxiliary electrical machine 124 are configured and operative to jointly supply rotational power to LP spool 26 to generate thrust via propulsor 28 for taxiing aircraft 10. In various embodiments, electrical power source 126 is electrically coupled to auxiliary electrical machine 124 and operative to supply electrical power to auxiliary electrical machine 124 for providing mechanical power to LP spool 26 and/or HP spool 24. By providing mechanical power via auxiliary electrical machine 124, the size of APU 122 may be reduced relative to similar systems that provide all of the power to LP spool 26 and/or HP spool 24 using the APU. The reduced size of APU 122 may translate to reduced weight, cost and fuel usage.

APU 122 includes an APU compressor 160, an APU combustor 163, and an APU turbine 164. Combustor 163 is fluidly disposed between compressor 160 and turbine 164. Compressor 160 is coupled to and driven by turbine 164. In various embodiments, combustor 163 may be a conventional combustor, or may be a start-up combustor as described above with respect to the embodiment of FIG. 3. In one form, APU 122 is mounted to gearbox 59. In other embodiments, APU 122 may be mounted at other locations.

In one form, auxiliary electrical machine 124 is configured to convert mechanical power to electrical power, and to convert electrical power to mechanical power, e.g., as in a motor/generator. In other embodiments, auxiliary electrical machine 124 may be configured to only convert electrical power into mechanical power, e.g., as in a motor.

In one form, electrical power source 126 is a combination of a battery 130 and a fuel cell 162. In other embodiments, electrical power source 126 may be a battery only, a fuel cell only, or any combination of one or more power sources capable of supplying electrical power to auxiliary electrical machine 124 in sufficient quantity for auxiliary electrical machine 124 to perform the tasks set forth herein. Battery 130 and fuel cell 162 are both in electrical communication with a power conditioner 170 for conditioning power supplied to aircraft 10 and/or engine 20 components from electrical power source 126. Power conditioner 170 is configured to receive electrical power from both fuel cell 162 and batter 130, and is also configured to deliver power to batter 130 to charge battery 130.

In one form, fuel cell 162 is a solid oxide fuel cell (SOFC). In other embodiments, other fuel cell types may be employed, e.g., such as a molten carbonate fuel cell (MCFC). Fuel cell 162 is similar to fuel cell 62, described above, and hence, descriptive material applied above to fuel cell 62 applies equally to fuel cell 162. For example, fuel cell 162 may include a reformer 165 similar to the previously mentioned reformer 65 employed by fuel cell 62. In one form, APU 122 is a hybrid APU configured similarly as hybrid APU 22, wherein fuel cell is part of the thermodynamic cycle of the APU, and adds heat to the air discharged by APU compressor 160 for mechanical power extraction by the APU turbine. As with hybrid APU 22, fuel cell 162 is in fluid communication with both compressor 160 and turbine 164 (as indicated by lines 160A and 164A, respectively), and functions similarly to fuel cell 62 mentioned previously. In other embodiments, fuel cell 162 may not be coupled APU 122 as part of a hybrid APU, but rather, may serve as a standalone fuel cell system for supplying electrical power to aircraft 10 via power conditioner 170 and/or auxiliary electrical machine 124 via power conditioner 170 and a power converter 180.

Figure 6:
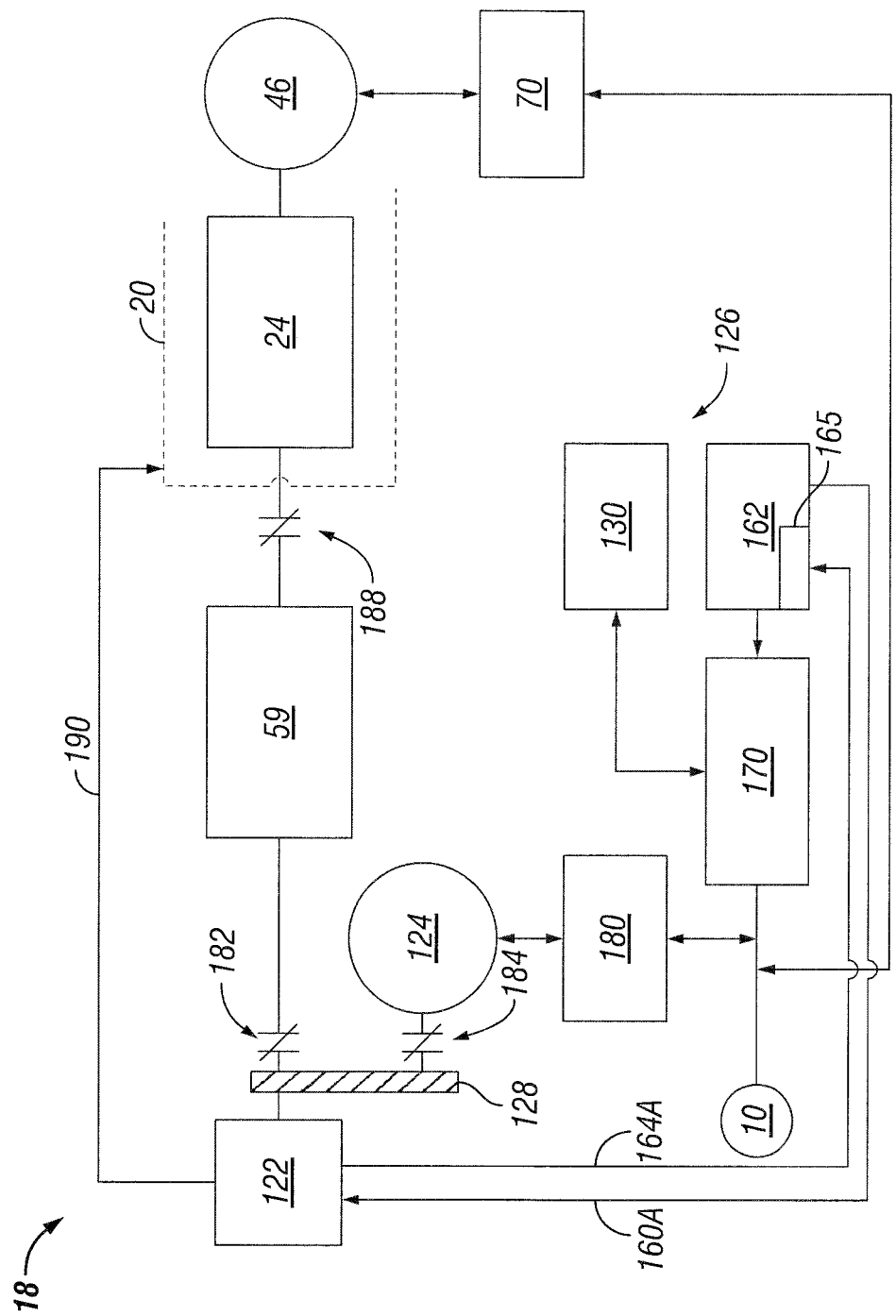
FIG. 6 schematically illustrates some aspects of a non-limiting example of the system of FIGS. 4 and 5 operating in a mode configured for taxiing an aircraft without starting one or more main propulsion engine(s) of the aircraft.
Figure 7:
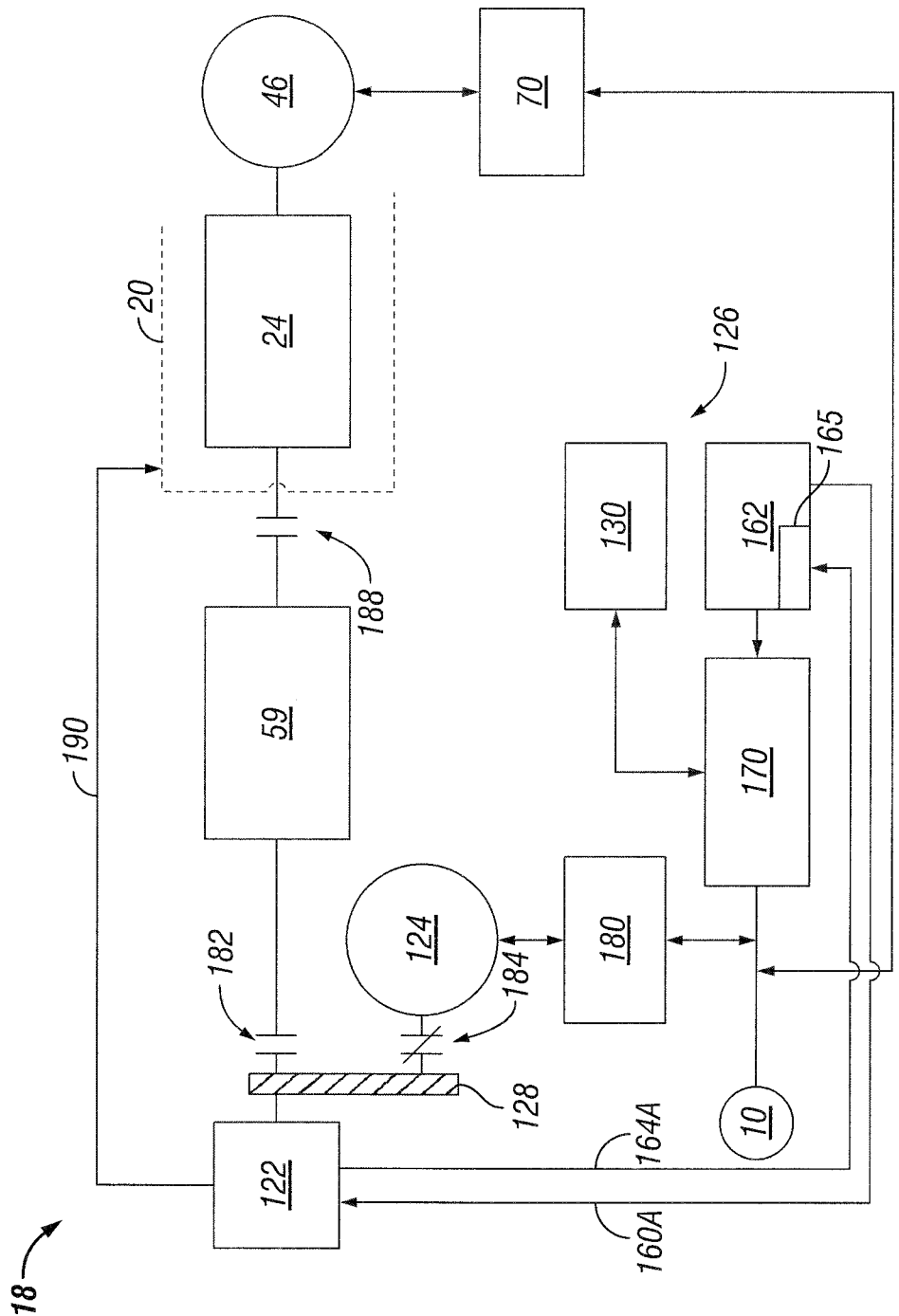
FIG. 7 schematically illustrates some aspects of a non-limiting example of the system of FIGS. 4 and 5 operating in a mode configured for starting an aircraft main propulsion engine.

Combining gearbox 128 is mechanically coupled to APU 122 and auxiliary electrical machine 124. Combining gearbox 128 is also coupled to engine 20, e.g., via gearbox 59, and configured to transmit mechanical power to HP spool 24 and LP spool 26 via shafting systems 78 and 74, respectively. In one form, combining gearbox 128 is coupled to engine 20 via a clutch 182; auxiliary electrical machine 124 is coupled to combining gearbox 128 via a clutch 184; gearbox 59 is coupled to LP spool 26 via a clutch 186; and gearbox 59 is coupled to HP spool 24 via a clutch 188 (FIGS. 6 and 7). In other embodiments, combining gearbox 128 may be coupled to engine 20 and spools 24 and 26 by other means in addition to or in place of those illustrated and described.

Combining gearbox 128 is configured to transmit mechanical power from auxiliary electrical machine 124 to APU 122 for starting APU 122. Combining gearbox 128 is also configured to transmit mechanical power from APU 122 to auxiliary electrical machine 124 for generating electrical power, e.g., for use by aircraft 10 via power converter 180 during flight and/or ground operations, for supplying electrical power from auxiliary electrical machine 124 to one or both of electrical machines 44 and 46, and/or for charging battery 130 via power conditioner 170. It will be understood that in various embodiments, electrical power generated by electrical machine 124 may be conditioned and/or distributed to aircraft 10, electrical machines 44 and 46 and battery 130, via various means in addition to or in place of the means illustrated and described herein.

Combining gearbox 128 is also configured to transmit mechanical power from APU 122 and/or auxiliary electrical machine 124 to engine 20 via gearbox 59, e.g., for taxiing aircraft 10 and/or for starting engine 20. In one form, mechanical power (shaft power) is transmitted from APU 122 and/or auxiliary electrical machine 124 to gearbox 59 by selectively engaging clutches 182 and 184. Gearbox 59 is configured to transfer power from APU 122 and/or auxiliary electrical machine 124 to LP spool 26 via clutch 186 for generating thrust via propulsor 28 for taxiing aircraft 10. Hence, in various embodiments, taxi operations may be performed by supplying mechanical power from APU 122 and/or auxiliary electrical machine 124 to LP shaft 26 via combining gearbox 128, engine gearbox 59, and clutches 182, 184 and 186. In other embodiments, other clutch and gearbox arrangements may be employed to obtain the same or similar results.

Similarly, gearbox 59 is configured to transfer power from APU 122 and/or auxiliary electrical machine 124 to HP spool 24 for starting gas turbine engine 20. For example, with reference to FIG. 6, in one form, mechanical power is transmitted from APU 122 and/or auxiliary electrical machine 124 to gearbox 59 by selectively engaging clutches 182 and 184. Gearbox 59 is configured to transfer power from APU 122 and/or auxiliary electrical machine 124 to HP spool 24 via clutch 188 for to mechanically supply power to HP spool 24 to rotate HP spool 24 to a speed sufficient for starting engine 20. In the depiction of FIG. 6, clutches 182, 184 and 188 are depicted as being engaged. Hence, in various embodiments engine 20 may be started by supplying mechanical power from APU 122 and/or auxiliary electrical machine 124 to HP spool 24 via combining gearbox 128 and engine gearbox 59. In other embodiments, other clutch and/or gearbox arrangements and/or other mechanical drive combinations may be employed to obtain the same or similar results. In some embodiments, prior to and/or during engine 20 starting, APU 122 exhaust may be supplied via ducting 190 to engine 20, e.g., HP spool 24 in order to warm up engine 20, which in some embodiments may also decrease the amount of time required for engine start.

In addition, with reference to FIG. 7, engine 20 may be started by supplying electrical power to electrical machine 46 to rotate HP spool 24 to a sufficient speed. In some embodiments, electrical power may also be supplied to LP spool 26 during engine 20 start. In the depiction of FIG. 7, clutches 184 and 188 are disengaged, whereas clutch 182 is engaged so that auxiliary electrical machine 124 may be driven by APU 122 to generate electrical power. In various embodiments, the electrical power for starting engine 20 may be supplied from electrical power source 126 (either or both of battery 130 and fuel cell 162) and/or auxiliary electrical machine 124 (powered by APU 122 via combining gearbox 128 and clutch 182). In other embodiments, other arrangements may be employed to obtain the same or similar results. In some embodiments, prior to and/or during engine 20 starting, APU 122 exhaust may be supplied via ducting 190 to engine 20, e.g., HP spool 24, in order to warm up engine 20, which in some embodiments may also decrease the amount of time required for engine start. It will be understood that in various embodiments, electrical power generated by electrical machine 124 and/or electrical power supplied by battery 130 and/or fuel cell 162 may be conditioned and/or distributed to aircraft 10, electrical machines 44 and 46 via various means in addition to or in place of the means illustrated and described herein.

Embodiments of the present invention include a propulsion system for an aircraft, comprising: a gas turbine engine having at least a high pressure (HP) spool and a low pressure (LP) spool, wherein the LP spool is operative to drive a propulsor; and a hybrid auxiliary power unit (APU) mechanically coupled to both the HP spool and the LP spool, wherein the hybrid APU includes an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine, wherein the hybrid APU is operative to supply rotational power to both the HP spool and the LP spool.

In a refinement, the hybrid APU further includes a start-up combustor fluidly disposed between the APU compressor and the APU turbine; and wherein the start-up combustor is configured to add heat to the air pressurized by the APU compressor for discharge into the APU turbine.

In another refinement, the gas turbine engine includes a gearbox; and wherein the hybrid APU is mounted on the gearbox.

In yet another refinement, the propulsion system further comprises a transmission mechanically disposed between the hybrid APU and one of the HP spool and the LP spool, wherein the transmission is operative to vary the speed of the one of the HP spool and the LP spool relative to the other of the HP spool and the LP spool.

In still another refinement, the transmission is a continuously variable transmission.

In yet still another refinement, the transmission is mechanically disposed between the hybrid APU and the HP spool; and wherein the transmission is operative to vary the speed of the HP spool relative to the LP spool.

In a further refinement, the propulsion system further comprises a controller configured to execute program instructions to control the transmission to vary a speed ratio between the HP spool and the LP spool to reduce internal drag in the gas turbine engine.

In a yet further refinement, the transmission is operative to selectively engage the one of the HP spool and the LP spool with the hybrid APU and to selectively disengage the one of the HP spool and the LP spool from the hybrid APU.

In a still further refinement, the propulsion system further comprises a reformer in fluid communication with the fuel cell, wherein the reformer is operative to reform aircraft fuel into syngas for use in the fuel cell.

Embodiments of the present invention include an aircraft, comprising: a fuselage; an empennage coupled to the fuselage; a plurality of wings coupled to the fuselage; and at least one propulsion system, including: a gas turbine engine having at least a high pressure (HP) spool and a low pressure (LP) spool, wherein the LP spool is operative to drive a propulsor; and wherein the gas turbine engine is coupled to at least one of the fuselage, the empennage and at least one of the plurality of wings; a hybrid auxiliary power unit (APU) mechanically coupled to both the HP spool and the LP spool, wherein the hybrid APU includes an output reduction gearbox, an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine; and wherein the hybrid APU is operative to supply rotational power to both the high pressure spool and the low pressure spool; and a shafting system mechanically coupling both the HP spool and the LP spool to the output reduction gearbox, wherein the hybrid APU is operative to supply rotational power to both the HP spool and the LP spool via the shafting system and the output reduction gearbox.

In a refinement, the hybrid APU is operative to provide power to the LP spool for generating thrust via the propulsor for taxiing the aircraft without having started the gas turbine engine.

In another refinement, the aircraft further comprises a clutch operative to selectively engage and to disengage the hybrid APU from the LP spool.

In yet another refinement, the fuel cell is configured to generate electrical power for use by the aircraft during ground operations and/or flight operations.

In still another refinement, the hybrid APU is configured to start the gas turbine engine by supplying mechanical power to rotate the HP spool.

In yet still another refinement, the hybrid APU is configured to start the gas turbine engine by supplying electrical power to rotate the HP spool.

In a further refinement, the aircraft further comprises an APU electrical machine mechanically coupled to and powered by the hybrid APU.

In a yet further refinement, the APU electrical machine is configured to generate electrical power for use by the aircraft during ground operations and/or flight operations.

In a still further refinement, the hybrid APU generates an exhaust; and wherein the exhaust is supplied to the gas turbine engine to warm up the gas turbine engine prior to starting the gas turbine engine.

In a yet still further refinement, the propulsor is a turbofan of the gas turbine engine.

Embodiments of the present invention include a system, comprising: a gas turbine engine having at least a high pressure (HP) spool and a low pressure (LP) spool, wherein the LP spool is operative to drive a propulsor; and means for supplying mechanical power from a hybrid APU to both the high pressure spool and the low pressure spool, wherein the means for supplying mechanical power is operative to supply rotational power to both the HP spool and the LP spool, wherein the hybrid APU includes an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine.

In a refinement, the system further comprises means for varying a rotational speed of one of the high pressure spool and the low pressure spool relative to the rotational speed of the other of the high pressure spool and the low pressure spool.

Embodiments of the present invention include a propulsion system for an aircraft, comprising: a gas turbine engine having at least a high pressure (HP) spool and a low pressure (LP) spool, wherein the LP spool is operative to drive a propulsor; an auxiliary power unit (APU) mechanically coupled to the LP spool and operative to drive the LP spool; an auxiliary electrical machine mechanically coupled to LP spool and operative to drive the LP spool; and an electrical power source electrically coupled to the auxiliary electrical machine, wherein the APU and the auxiliary electrical machine are configured and operative to jointly supply rotational power to the LP spool to generate thrust via the propulsor for taxiing the aircraft.

In a refinement, the electrical power source is a battery.

In another refinement, the electrical power source is a fuel cell.

In yet another refinement, the electrical power source is a combination of a fuel cell and a battery.

In still another refinement, the APU is a hybrid APU having an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine.

In yet still another refinement, the propulsion system further comprises an auxiliary combining gearbox mechanically coupled to the APU, the auxiliary electrical machine and the gas turbine engine.

In a further refinement, the auxiliary combining gearbox is configured to transmit mechanical power from the auxiliary electrical machine to the APU for starting the APU.

In a yet further refinement, the auxiliary combining gearbox is configured to transmit mechanical power from the APU to the auxiliary electrical machine for generating electrical power.

In a still further refinement, the auxiliary combining gearbox is configured to transmit mechanical power from the APU to the gas turbine engine.

In a yet still further refinement, the auxiliary combining gearbox is configured to transmit mechanical power from the auxiliary electrical machine to the gas turbine engine.

In additional refinement, the auxiliary combining gearbox is configured to transmit mechanical power from both the auxiliary electrical machine and the APU to the gas turbine engine.

In another additional refinement, the gas turbine engine includes a gearbox; wherein the APU is mounted on the gearbox; and wherein the gearbox is configured to transfer power from the APU to the HP spool for starting the gas turbine engine.

In yet another additional refinement, the gearbox is configured to transfer power from the APU and the auxiliary electrical machine to the HP spool for starting the gas turbine engine.

In still another additional refinement, the gas turbine engine includes a gearbox; wherein the APU is mounted on the gearbox; and wherein the gearbox is configured to transfer power from the APU and the auxiliary electrical machine to the LP spool to generate thrust via the propulsor for taxiing the aircraft.

Embodiments of the present invention include an aircraft, comprising: a fuselage; an empennage coupled to the fuselage; a plurality of wings coupled to the fuselage; and at least one propulsion system, including: a gas turbine engine having at least a high pressure (HP) spool and a low pressure (LP) spool and an engine gearbox, wherein the LP spool is operative to drive a propulsor; and wherein the gas turbine engine is coupled to at least one of the fuselage, the empennage and at least one of the plurality of wings; an auxiliary power unit (APU) mechanically coupled to the LP spool via the gearbox and operative to drive the LP spool; an auxiliary electrical machine mechanically coupled to LP spool via the gearbox and operative to drive the LP spool; an electrical power source electrically coupled to the auxiliary electrical machine, wherein the APU and the auxiliary electrical machine are configured and operative to jointly supply rotational power via the engine gearbox to the LP spool to generate thrust via the propulsor for taxiing the aircraft.

In a refinement, the engine gearbox is also configured to mechanically couple the APU to the HP spool for starting the gas turbine engine.

In another refinement, the engine gearbox is configured to mechanically couple the auxiliary electrical machine to the HP spool to starting the gas turbine engine.

In yet another refinement, the aircraft further comprises an engine electrical machine mounted on the HP spool and electrically coupled to at least one of the electrical power source and the auxiliary electrical machine, wherein the engine electrical machine, and the at least one of the electrical power source and the auxiliary electrical machine are configured to start the gas turbine engine by supplying electrical power to the engine electrical machine, whereby the engine electrical machine imparts rotation to the HP spool sufficient to start the gas turbine engine.

In still another refinement, the electrical power source is at least one of a fuel cell and a battery.

In a yet still another refinement, the electrical power source is a combination of a fuel cell and a battery.

In a further refinement, the APU is a hybrid APU having an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine.

Embodiments of the present invention include a system, comprising: a gas turbine engine having at least a high pressure (HP) spool and a low pressure (LP) spool, wherein the LP spool is operative to drive a propulsor; and means for supplying mechanical power from at least two sources to the low pressure spool for taxiing an aircraft.

In a refinement, the at least two sources include an auxiliary power unit (APU) and an auxiliary electrical machine, wherein the auxiliary electrical machine is powered by at least one of a fuel cell and a battery.

In another refinement, the APU is a hybrid APU employing the fuel cell in the hybrid APU thermodynamic cycle.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A propulsion system for an aircraft, comprising:
a gas turbine engine having at least a high pressure (HP) spool and a low pressure (LP) spool, wherein the LP spool is operative to drive a propulsor; and
a hybrid auxiliary power unit (APU) mechanically coupled to both the HP spool and the LP spool, wherein the hybrid APU includes an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine, wherein the hybrid APU is operative to supply rotational power to both the HP spool and the LP spool at the same time.

2. The propulsion system of claim 1, wherein the hybrid APU further includes a start-up combustor fluidly disposed between the APU compressor and the APU turbine; and wherein the start-up combustor is configured to add heat to the air pressurized by the APU compressor for discharge into the APU turbine.

3. The propulsion system of claim 1, wherein the gas turbine engine includes a gearbox; and wherein the hybrid APU is mounted on the gearbox.

4. The propulsion system of claim 1, further comprising a transmission mechanically disposed between the hybrid APU and one of the HP spool and the LP spool, wherein the transmission is operative to vary the speed of the one of the HP spool and the LP spool relative to the other of the HP spool and the LP spool.

5. The propulsion system of claim 4, wherein the transmission is a continuously variable transmission.

6. The propulsion system of claim 4, wherein the transmission is mechanically disposed between the hybrid APU and the HP spool; and wherein the transmission is operative to vary the speed of the HP spool relative to the LP spool.

7. The propulsion system of claim 4, further comprising a controller configured to execute program instructions to control the transmission to vary a speed ratio between the HP spool and the LP spool to reduce internal drag in the gas turbine engine.

8. The propulsion system of claim 4, wherein the transmission is operative to selectively engage the one of the HP spool and the LP spool with the hybrid APU and to selectively disengage the one of the HP spool and the LP spool from the hybrid APU.

9. The propulsion system of claim 1, further comprising a reformer in fluid communication with the fuel cell, wherein the reformer is operative to reform aircraft fuel into syngas for use in the fuel cell.

10. An aircraft, comprising:
a fuselage;
an empennage coupled to the fuselage;
a plurality of wings coupled to the fuselage; and
at least one propulsion system, including:
a gas turbine engine having at least a high pressure (HP) spool and a low pressure (LP) spool, wherein the LP spool is operative to drive a propulsor; and wherein the gas turbine engine is coupled to at least one of the fuselage, the empennage and at least one of the plurality of wings;
a hybrid auxiliary power unit (APU) mechanically coupled to both the HP spool and the LP spool, wherein the hybrid APU includes an output reduction gearbox, an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine; and wherein the hybrid APU is operative to supply rotational power to both the high pressure spool and the low pressure spool at the same time; and
a shafting system mechanically coupling both the HP spool and the LP spool to the output reduction gearbox, wherein the hybrid APU is operative to supply rotational power to both the HP spool and the LP spool via the shafting system and the output reduction gearbox.

11. The aircraft of claim 10, wherein the hybrid APU is operative to provide power to the LP spool for generating thrust via the propulsor for taxiing the aircraft without having started the gas turbine engine.

12. The aircraft of claim 10, further comprising a clutch operative to selectively engage and to disengage the hybrid APU from the LP spool.

13. The aircraft of claim 10, wherein the fuel cell is configured to generate electrical power for use by the aircraft during ground operations and/or flight operations.

14. The aircraft of claim 10, wherein the hybrid APU is configured to start the gas turbine engine by supplying mechanical power to rotate the HP spool.

15. The aircraft of claim 10, wherein the hybrid APU is configured to start the gas turbine engine by supplying electrical power to rotate the HP spool.

16. The aircraft of claim 10, further comprising an APU electrical machine mechanically coupled to and powered by the hybrid APU.

17. The aircraft of claim 16, wherein the APU electrical machine is configured to generate electrical power for use by the aircraft during ground operations and/or flight operations.

18. The aircraft of claim 10, wherein the hybrid APU generates an exhaust; and wherein the exhaust is supplied to the gas turbine engine to warm up the gas turbine engine prior to starting the gas turbine engine.

19. The propulsion system of claim 10, wherein the propulsor is a turbofan of the gas turbine engine.

20. The system of claim 19, further comprising means for varying a rotational speed of one of the high pressure spool and the low pressure spool relative to the rotational speed of the other of the high pressure spool and the low pressure spool.

21. A system, comprising:
a gas turbine engine having at least a high pressure (HP) spool and a low pressure (LP) spool, wherein the LP spool is operative to drive a propulsor; and means for supplying mechanical power from a hybrid APU to both the high pressure spool and the low pressure spool, wherein the means for supplying mechanical power is operative to supply rotational power to both the HP spool and the LP spool at the same time, wherein the hybrid APU includes an APU compressor; an APU turbine; and a fuel cell fluidly disposed between the APU compressor and the APU turbine, wherein the fuel cell is operative to receive as an oxidant air pressurized by the APU compressor; to generate electrical power using a fuel and the oxidant; to heat the air pressurized by the APU compressor; and to discharge the heated pressurized air into the APU turbine.

* * * * *